Jan. 13, 1970 A. L. J. BUCKLE ET AL 3,489,521
AUTOMATIC LABORATORY
Filed June 20, 1966 13 Sheets-Sheet 5
FIG. 13.
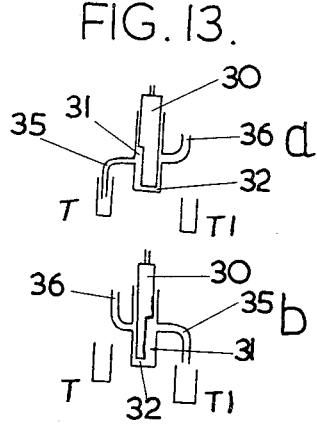
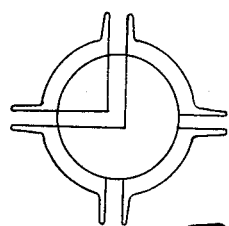
FIG 14
FIG 15
INVENTORS
Arnold Leslie John Buckle
and
Clifford Riles
By Jacobs & Jacobs
ATTORNEYS INVENTORS
Arnold Leslie John Buckle
and
Clifford Riley
By Jacob Jacobs
ATTORNEYS Jan. 13, 1970    A. L. J. BUCKLE ET AL    3,489,521
AUTOMATIC LABORATORY Filed June 20, 1966    13 Sheets-Sheet 8

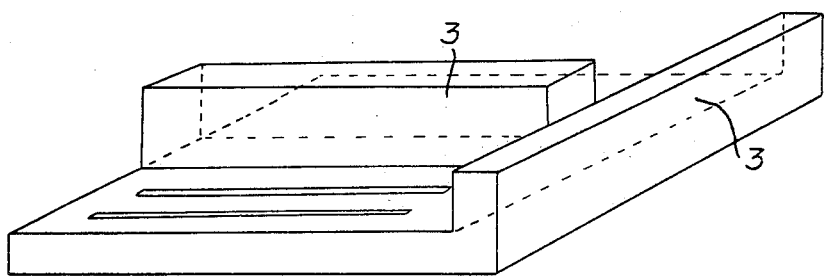
FIG.I.
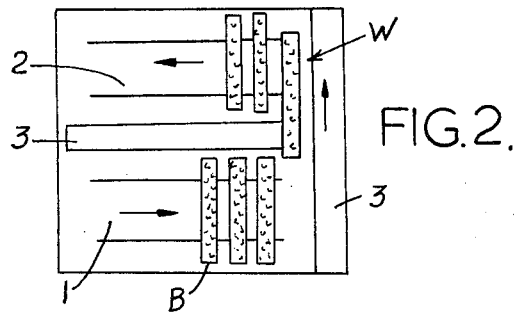
FIG.2.
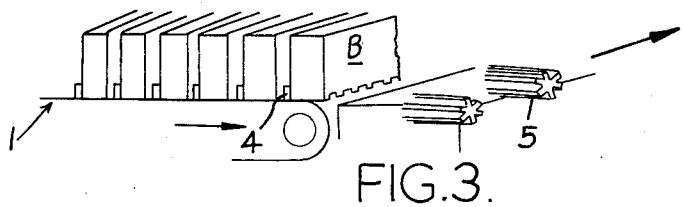
FIG.3.
INVENTORS
Arnold Leslie John Buckle
and
CLIFFORD Riley
By Jacob & Jacobs
ATTORNEYS

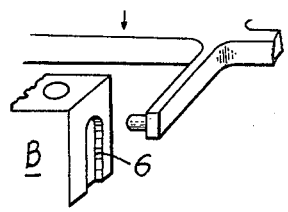
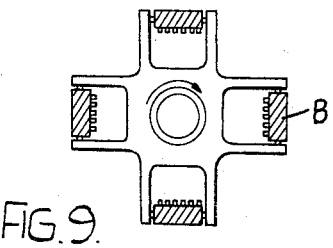
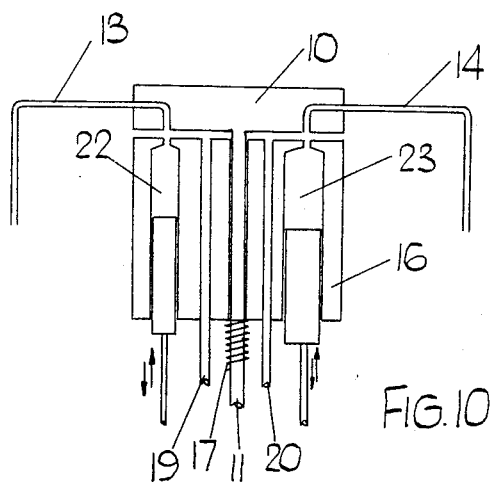
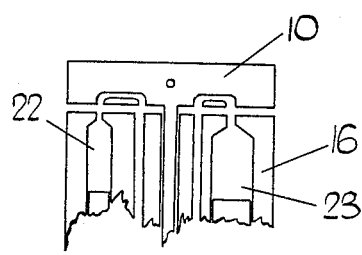

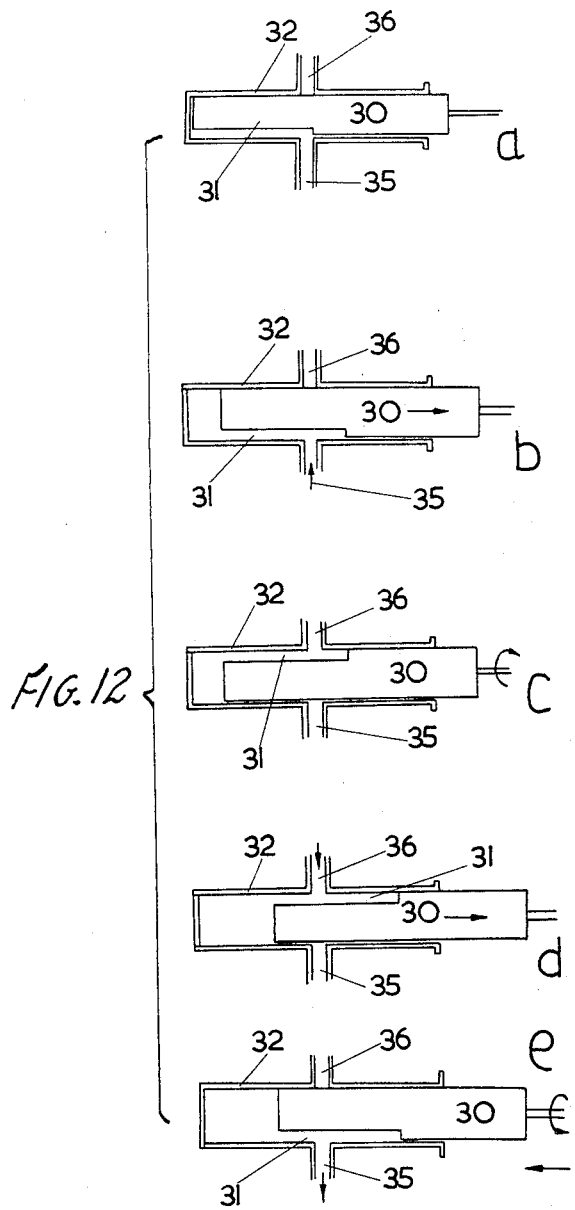

INVENTORS
Arnold Leslie John Buckle
and
Clifford Riley
by Jacobs & Jacobs
ATTORNEYS Jan. 13, 1970     A. L. J. BUCKLE ET AL     3,489,521
AUTOMATIC LABORATORY Filed June 20, 1966                                                       13 Sheets-Sheet 10

INVENTORS
Arnold Leslie John Buckle
and
Clifford Riles

By Jacobs + Jacobs
ATTORNEYS

INVENTORS
Arnold Leslie John Buckle
and
Clifford Riley
by Jacobs&Jacobs
ATTORNEYS Jan. 13, 1970  A. L. J. BUCKLE ET AL  3,489,521
AUTOMATIC LABORATORY Filed June 20, 1966  13 Sheets-Sheet 13

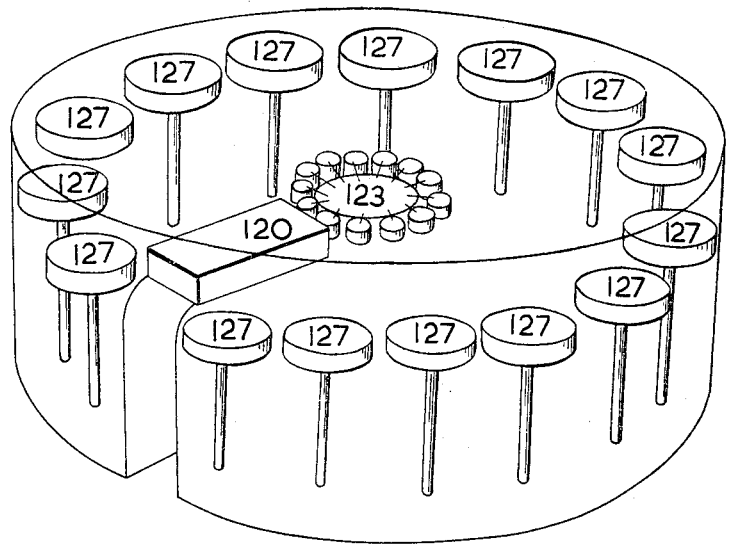

FIG. 30.

| | 1 | 2 | 3 | 4 | 5 | 6 | 7 | |
|---|---|---|---|---|---|---|---|---|
| | | | | | | FAILS TO OPERATE | | VIAL SWITCH |
| | | | | | | | OPERATED BY CAP | 'STANDARD' SWITCH |
| | | | | EXCEEDS LIMIT OF TRAVEL | EXCEEDS LIMIT OF TRAVEL | | | PIN P1 |
| | $=\dfrac{OD_2}{OD_3}$ | | | | NOT REACHED | | | $OD_1/OD_2$ |
| | DOES NOT START TRAVEL | DOES NOT COMPLETE TRAVEL | | | | | | PIN P2 |
| | $=\dfrac{OD_1}{OD_2}$ | | | | | | | $OD_2/OD_3$ |

FIG. 32.

INVENTORS
Arnold Leslie John Buckle
and
Clifford Riley
by Jacobs & Jacobs
ATTORNEYS United States Patent Office 3,489,521
Patented Jan. 13, 1970

3,489,521
AUTOMATIC LABORATORY
Arnold L. J. Buckle, London, and Clifford Riley, Burgess Hill, England, assignors to Vickers Limited, London, England
Filed June 20, 1966, Ser. No. 558,891
Int. Cl. G01n 31/00, 33/00
U.S. Cl. 23—253                    12 Claims

ABSTRACT OF THE DISCLOSURE

An automatic laboratory in which receptacles are conveyed to a station at which sample liquid is withdrawn from each receptacle, the withdrawn sample of liquid is then mixed with a diluent and discharged into other receptacles that are conveyed to a treatment channel whereat liquid is withdrawn from each such further receptacle and diluent and/or reagent added to the withdrawn liquid.

---

The invention relates to an automatic laboratory, that is to say apparatus in which a sequence of operations can be performed automatically on a liquid sample. The invention is particularly applicable to analytical apparatus, although it may be adapted to certain simple syntheses, and in the preferred embodiment it is concerned with measurement of properties of human body fluids and preferably the preparation of cards recording a number of parameters of the blood of out-patients who expect to be admitted to hospital. Such cards are useful in diagnosis, may be prepared from a single sample and thus spare the patient repeated handling, and streamline the organization and management of patients. The invention may be useful for population screening for preventive medicine and could be adapted to the assay of other body fluids such as urine, although the most useful indications of biochemical disease are obtainable from the blood.

The invention provides an automatic laboratory which comprises means for conveying receptacles for liquid samples, means for withdrawing a predetermined quantity of the liquid sample from each receptacle in sequence into another receptacle, means for adding a predetermined quantity of liquid to the sample, the said other receptacle being mounted on a device capable of moving the said other receptacle through a number of stations, means for withdrawing a predetermined quantity of treated sample from the said other receptacles at a number of the stations, and means for the addition of reagent and/or diluent to the last fluid so withdrawn.

An analytical laboratory according to the invention includes means for the analysis of the fluid so treated, and means for the recordal of the results of the analysis, including means for ensuring that the results recorded are correlated with the sample to which they refer and preferably for printing them on a card in an easily comprehensible form for use at a later stage. The addition of reagent and/or diluent to the last fluid is carried out in a reaction rotor around which reagent adheres, a stirrer, a heater, means for the analysis of the treated fluid, and a tube laundry are arranged to operate on liquids in the tubes. A single channel laboratory simply has one reaction rotor fed from a distributor for moving the said other tubes through a number of stations. Multi-channel laboratories having for example twelve or even up to fifteen channels have that number of reaction rotors fed from the distributor. The means for adding liquid and reagent and/or diluent to the two sets of receptacles is generally the same in each case. The preferred liquid samples are blood and to a lesser extent urine, and the liquid added is a diluent, generally water.

In a synthetic laboratory according to the invention, the liquid sample is the starting material and the liquids added are reagents. Such a laboratory is useful for treating a number of liquid samples in an exactly similar way and thus for determining the effect on a two-stage reaction of, for example, the concentration of the starting material.

The bank for receptacles preferably comprises a number of blocks of tubes and means for advancing the tubes in sequence to a withdrawal station. Individual blocks may be capable of being centrifuged so as to separate the red cells from the plasma in each tube. The blocks are preferably urged in the bank in sequence towards a final position in which they or the tubes in them are advanced, for example by means of a toothed wheel engaging the lower end of the block or of the individual tubes. The tubes may be pretreated with anticoagulant and disposed of after a single use. The bank should preferably include a refrigerator for cooling the bottoms of the tubes.

At the withdrawal station there is preferably a senser for the level of the red cells in the tube after centrifuging, and means such as a plunger for moving the tube to a level such that only plasma is withdrawn.

Both the device for moving the said other tubes and any other parts of the laboratory which comprise belts or turntables and numbers of tubes, except the bank of tubes, preferably have stations for the washing, drying and sterilizing of tubes so that they can be reused without removal. They may also have stirrer stations at which a rotatable magnet such as a plastic coated ball or a fixed electro-magnet run on alternating current rotates a magnetic slug in the tube or vibrates a read, and heater stations. By passing the tubes through an annular bath it is possible to heat the tube contents evenly. Alternatively the whole rotor may be heated by means of electrical heater elements or through the rotor being made of an electrical insulator (for example an epoxy resin) loaded with graphite which is itself subjected to electrical current heating.

The term "tube" is used herein to mean any suitable container or receptacle such as a test tube or beaker without any special limitation as to shape, size or material of construction, except where the sense plainly demands otherwise. The said other tubes and those in subsequent equipment may simply constitute cavities in a holder device.

The means for withdrawing predetermined quantities of fluid preferably comprise a dip-tube of non-wettable plastics material, for example polyethylene or polytetrafluoroethylene, having a tapered open end, means for wiping the tip and a piston moveable in a cylinder through a predetermined distance so as to draw up into the diptube an appropriate quantity of liquid and discharge it through the dip-tube followed by a predetermined quantity of diluent from another similar piston and cylinder which has the effect of washing out the dip-tube, means being provided for moving the dip-tube from one tube to another while full of liquid. Alternatively the dip-tube may be connected to a source of vacuum and be expelled mixed with diluent. The volume of sample taken can be varied by changing the head of such a device to alter the cylinder size.

The means for moving tubes through different stations and subsequent reaction rotors may be in the form of a circular rack holding test tubes of suitable plastics material such as polytetrafluoroethylene running in an annular or circular thermostatted water-bath, or a metal annulus with cavities drilled in it to form test tubes, and these cavities being coated with gold or platinum or polytetrafluoroethylene, for example. Heating may be by elements embedded in the annulus. Certain rotors may be provided with a double row of holes so that a reagent blank may be included for comparative analysis.

Analytical reagents may be dispensed into the reaction rotor by a motorised burette or by a multiport dilutor.

Analyses require markedly different concentrations of material for testing and take different times both for the preparation of the sample and for the examination itself. It is possible to mitigate the effect of these differences and synchronize the production of results by subjecting the fluids withdrawn at the earlier stations to the analyses which take more time. The fluids may be subjected to analyses requiring greater concentrations after only one dilution. The actual analyses performed can be varied according to the information required, to take account of improved techniques, or because a particular analysis is found ineffective or to give results directly related to those of another analysis. The laboratory can thus monitor its own effectiveness. The analyses are preferably photometric so as to minimize handling. Visible, ultraviolet, flame, fluorescent and turbidity photometric analysis and electrical conductivity measurement of liquids treated with appropriate reagents at appropriate dilutions can be used to measure the content of sugar, urea, calcium, sodium, potassium, iron, haemoglobin, liver function enzyme, leucocyte, cholesterol, protein, chloride, bicarbonate, alkaline phosphatase, acid phosphatase, zinc sulphate turbidity, thymol turbidity, bilirubin, glutamic oxalacetic and pyruvic transaminase, isocitric and lactic dehydrogenase, creatinin, inorganic phosphate, gamma-globulin and uric acid for example. A simple colourimeter consisting of a bulb, photo-cell, filter, and potentiometer may be used in most channels. Alternatively probe colourimeters which can be dipped into the liquid can be used.

The means by which the samples are transferred to analysis need not be as precise as the withdrawal and dilution means since it is only necessary to fill a cuvette or measuring chamber in a detector. A simple suction transfer device would serve or a small peristaltic pump. If the detector is a flame photometer it would be self-filling since it would suck the sample into its atomising system. A colourimeter (or U.V. photometer) could similarly be equipped with a suction or self-filling cuvette.

The recordal of the results of the analysis may be on punch cards and the readings should be standardized and corrected for error by regularly examining control fluids having known concentrations of the substances for which analysis is effected.

The equipment may be programmed so that in the event of a standard indicating an error, a warning will be given or the machine stopped. Positional errors, that may arise (assuming that the samples have been inserted correctly in the first place) may be overcome by using an electrical synchronising pulse, derived from a master controller to actuate electrically a distributor turntable for moving tubes through different stations so that each turntable will be driven, and can only be driven by the application of this master pulse. As an extra safeguard, an answer to electrical pulses from each turntable on reaching correct station may be employed. Such answer pulses may be used to feed one re-setting circuit per channel, so that if there has been mechanical or electrical malfunction in that particular channel, then the master controller pulse is no longer capable of driving the channel through further stations, and appropriate alarms may be operated. This need not render the other channels ineffective unless the master distributor turntable has been affected. The driving actuator for each turntable may be either a stepped electrical motor, or solenoid operated ratchet drive.

The blocks for tubes may be provided with a system of electronic identification, for example series of holes drilled through for photometric identification or a pattern of electrical contacts or depressions to accommodate microswitches. At the data handling section of the machine a number of rectangular slots (numbered) may be provided to accommodate sets of 10 cards each. Each corresponds to one block and releases the cards to receive data in the same fashion as a carrier attached to the block for tubes, one as each tube reaches the withdrawal station.

The tubes may be raised by a pin at the withdrawal station and viewed by a photoelectric scanner, the lifting mechanism being arrested when the light beam is cut by the layer of packed red cells. A system of rejection may be included. If the plasma is haemolysed or lipaemic, the sample tube will rise only a short distance. Conversely, if an insufficient sample is provided the tube will rise a greater distance than usual. In each of these cases closure of suitable contacts on the lifting mechanism rejects the sample. An empty tube will similarly be rejected. A system may be provided such that the length of the column of plasma is observed, thus automatically giving a measure of haematocrit. This may be arranged by observing two signal strengths of the photoelectric scanner, or providing two scanners, sensitive to different optical densities.

The block in the tube banks may be withdrawable one space (or position) at a time from its housing in the dispenser so as to expose one fresh tube at a time, together with a blank report card which carries a punching relating the card to that one space (or position) in the block. The sample tube is then filled with a patient's blood sample and the patient's particulars are handwritten or typed or printed on the corresponding report card. The collected samples together with the cards (unsorted) are returned to the laboratory and the set of ten report cards is placed in the appropriate slot of a printer-sorter. The initial tubes need have no identity except in their position in the block.

In the bank the tubes are generally stored at temperatures below ambient. The tubes are presented at a predetermined constant rate to a point and, after sampling, returns them to store. Such mechanism should only accept correctly orientated blocks either intermittently or continuously.

As the blocks are processed signals are sent to the printer-sorter which places the report cards in the order in which the samples are being analysed. The signals are for example derived from pegs of different heights at each end of the blocks which close circuits in a characteristic pattern or from metal sleeves which slip over a tube containing a standard sample and similarly produce characteristic signals. If, when the report cards are initially placed in the slots of the printer-sorter the pegs or metal sleeves are taken from the appropriate slot and inserted in the block so that the set of cards is keyed to the corresponding samples.

At the withdrawal station a check should be incorporated to cover the following situations:

(1) Sample satisfactory _____ No haemolysis, adequate volume.
(2) Sample not satisfactory ___ Haemolysed.
(3) Sample not satisfactory ___ Low ratio plasma:red cells.
(4) Sample not satisfactory ___ Inadequate volume.
(5) Sample not satisfactory ___ Empty tube.
(6) Sample not satisfactory ___ No tube.
(7) Sample special _____ Standard sample.

These conditions can be signalled to a monitor channel in the printer sorter and/or in a tape punch by using the following tube feed mechanism:

At the withdrawal station, the tubes are lifted to immerse the tip of the diluter in plasma by means of two (hydraulic or cam or piston operated) concentric pins whose movement is sequential and additive. The movements of the two pins are controlled by a light beam and photocell system which looks through (i.e. at 90° to the length) the sample tube as it is lifted to the dilution. The photo-electric system registers three levels of light transmission or optical density.

(1) Empty vial, i.e. 100% T or $OD_1$
(2) Plasma, i.e. $OD_2$
(3) packed red cells or haemolysed blood, i.e. 0% T or $OD_3$ (OD indicating the optical density of the tube examined.)

It has therefore to sense two changes of optical density, $OD_1/OD_2$ and $OD_2/OD_3$.

In operation, the block moves into a fresh position with a sample (or without)

(a) pin rises through a hole in the base of the block and lifts the vial until the level $OD_1/OD_2$ is reached and then stops—if this exceeds a pre-set distance of travel the system signals "situation 4 or 5"—(if the sample vial does not directly operate a micro switch as the block moves into the fresh position then the pin does not rise and "situation 6" is signalled)
(b) if levels $OD_1/OD_2$ and $OD_2/OD_3$ are signalled simultaneously then the system signals "situation 2"
(c) a second pin now rises and stops when level $OD_2/OD_3$ is reached; if the travel of $P_2$ is less than a pre-set amount the system signals "situation 3" otherwise "situation 1" is signalled
(d) a metallised cap or closure on each standard sample can operate contacts to indicate "situation 7"

Where the sample condition is not satisfactory (situations 2–6) the sample feeder can immediately move on to the next sample position where the operating speed of the analyser permits this to be done and maintain phase. The operation is illustrated in FIGURE 32 of the accompanying drawings.

A preferred automatic laboratory according to the invention measures from twelve to fifteen parameters of body fluids. The bank of tubes has placed for 300 tubes. The device for moving the tubes has places for 60 tubes and so does a similar device in which the reagent and/or diluent is added and in which the analysis is carried out. The enzymatic treatments which are carried out at 37° to 45° C. are performed in a different zone from the flame photometric analyses. Samples of blood of 5 to 10 cc. are placed in tubes. Both the first and the second dilutions are about 10 fold. Such a laboratory is capable of operating at 100 to 300 samples per hour and thus of serving a hospital by working 3 hours per day, leaving the laboratory staff free for the collection of samples and other work during the rest of the day.

If an individual subjected himself to examination at a laboratory according to the invention at regular intervals it would be possible by comparison of successive result cards to detect and thus anticipate the onset of certain diseases. A nation or world-wide network of such laboratories would thus contribute to health and welfare by the prevention of disease.

An automatic laboratory for the analysis of human blood samples according to the invention is illustrated by way of example in the accompanying drawings in which figures are grouped according to the part of the laboratory they illustrate:

TUBE BANK

FIGURE 1 schematically shows a perspective view of a tube bank as a whole;

FIGURE 2 is a plan of the tube bank of FIGURE 1;

FIGURE 3 is a part perspective view showing the transfer of sample blocks towards the withdrawal station;

Figure 4:
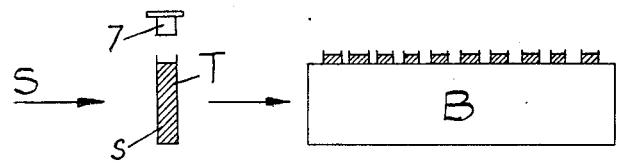
Figure 5:
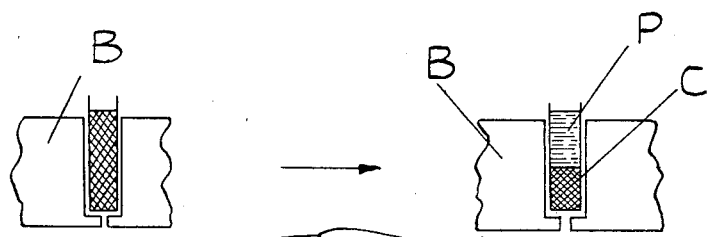
Figure 6:
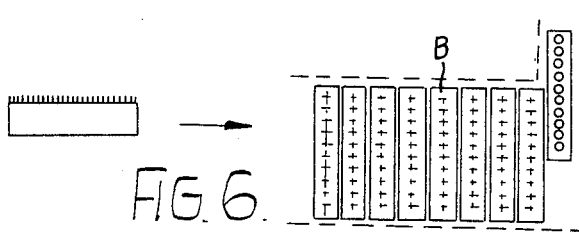
Figure 7:

FIGURE 4 diagrammatically shows the transfer of a sample of blood from a patient to the laboratory;

FIGURE 5 shows the effect of centrifuging the sample of FIGURE 4;

FIGURE 6 diagrammatically shows the arrangement of a number of blocks of samples after the centrifuging of FIGURE 5 in a tube bank;

FIGURE 7 shows an empty block in perspective;

FIGURE 8 is a partial perspective view showing the engagement of one end of the block shown in FIGURE 7 in a centrifuge;

FIGURE 9 shows four blocks as in FIGURE 8 being centrifuged;

WITHDRAWAL AND DILUTION MEANS

Figure 16:
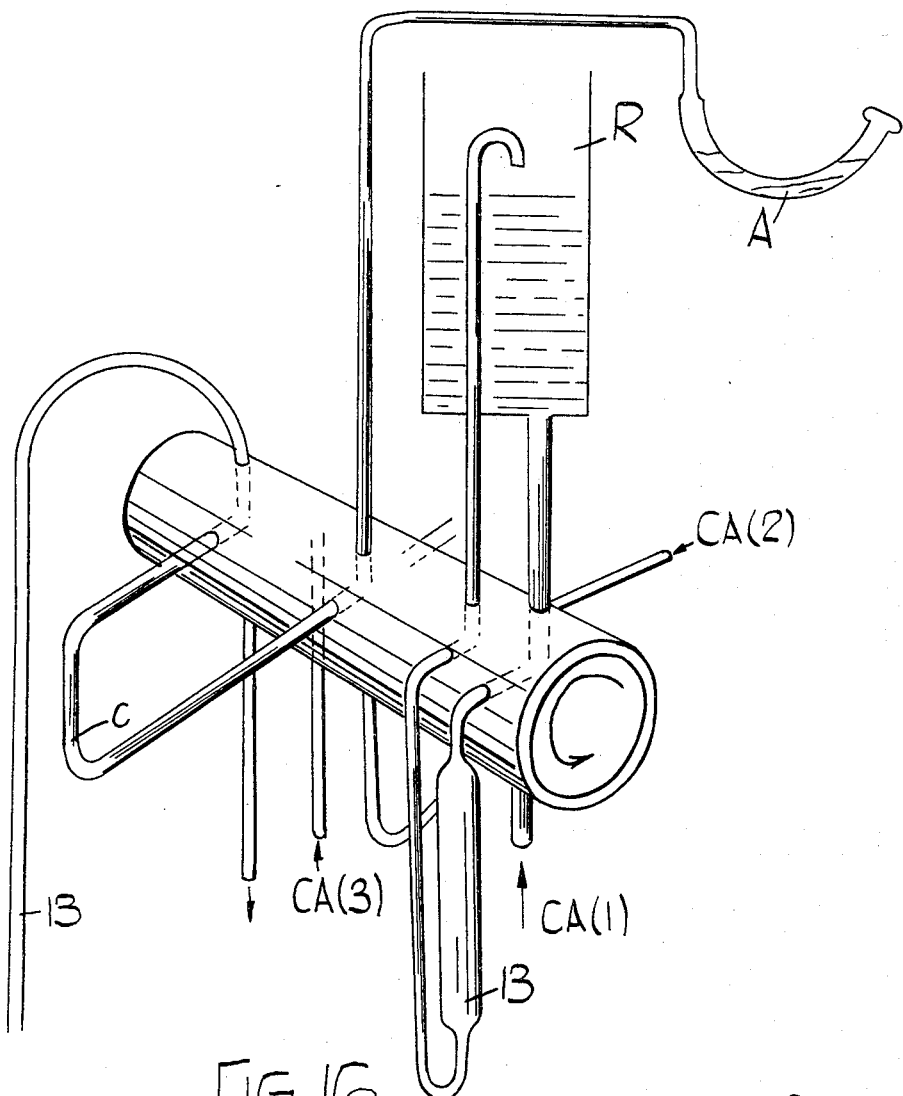

FIGURE 10 is a section through withdrawal means suitable for withdrawing liquid from a tube at the withdrawal station at the end of the tube bank illustrated in FIGURES 1 to 3, diluting it and discharging it into another tube;

FIGURE 11 is a section corresponding to FIGURE 10 with the head rotated through 90°;

FIGURE 12 shows in section alternative withdrawal means to that shown in FIGURES 10 and 11, parts a, b, c, d and e indicating the sequence of operation;

FIGURE 13 shows in section a modified version of the withdrawal means of FIGURE 12, parts a and b indicating the sequence of operation;

FIGURE 14 is a perspective view of a multiport tap suitable for alternative withdrawal means;

FIGURE 15 is a section through the tap of FIGURE 14 at each of the outlets;

FIGURE 16 is a schematic representation of alternative withdrawal means incorporating a multiport tap as shown in FIGURES 14 and 15;

DISTRIBUTOR

Figure 17:
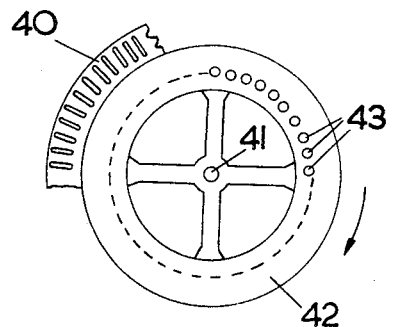
Figure 18:
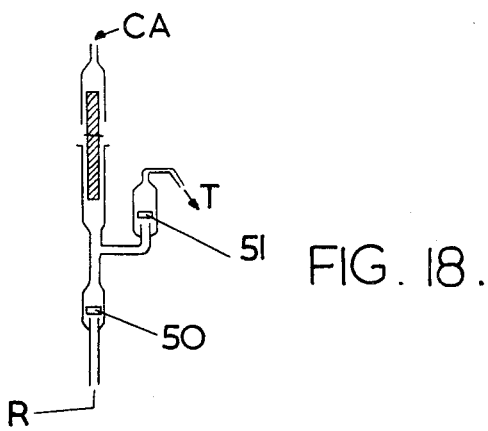
Figure 19:
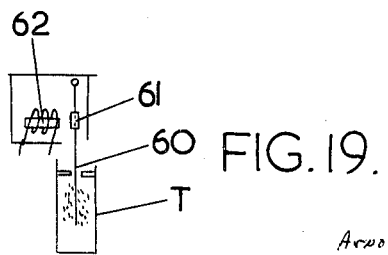

FIGURE 17 is a plan of a distributor for moving tubes through a number of stations;

FIGURE 18 is a schematic elevation of means for reagent addition;

FIGURE 19 is a schematic elevation of a stirrer;

DETECTOR-ANALYSER

Figure 20:
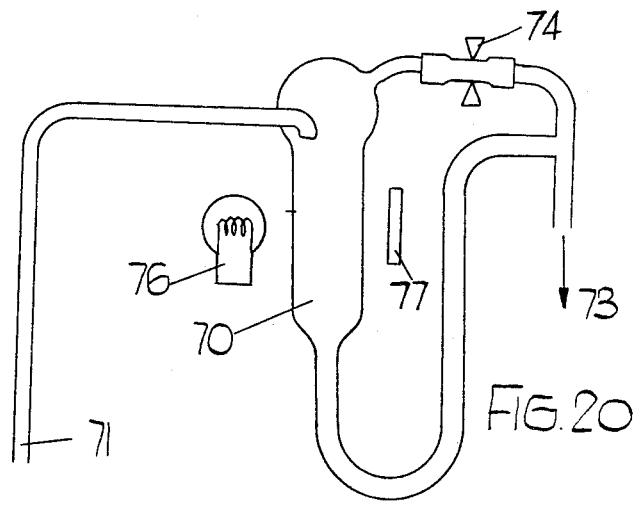
Figure 21:
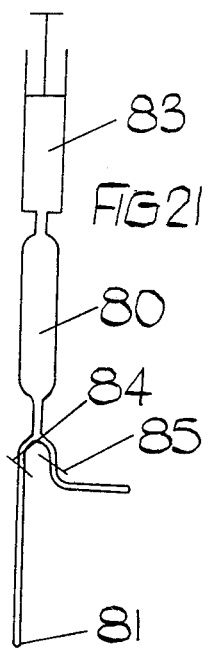
Figure 22:
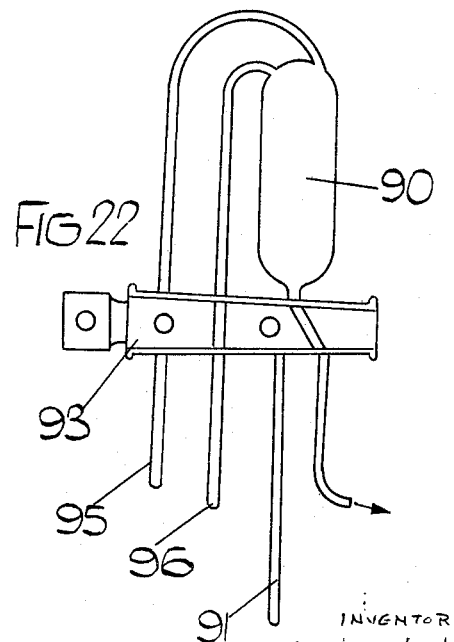

FIGURE 20 is a diagrammatic elevation of a colourimeter flow through cell with transfer device;

FIGURE 21 is a diagrammatic elevation of a pressure transfer device for a flame photometer;

FIGURE 22 is an alternative to FIGURE 21;

MISCELLANEOUS

Figure 23:
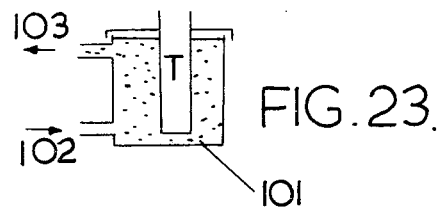
Figure 24:
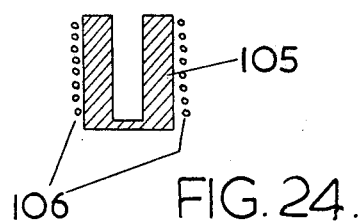
Figure 25:
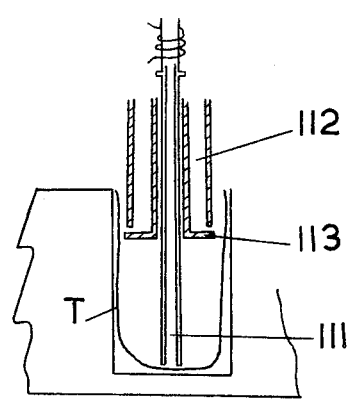

FIGURES 23 and 24 show alternative means for heating the reaction rotor;

FIGURE 25 is a schematic elevation of a wash head for a tube laundry;

GENERAL ARRANGEMENTS

Figure 26:
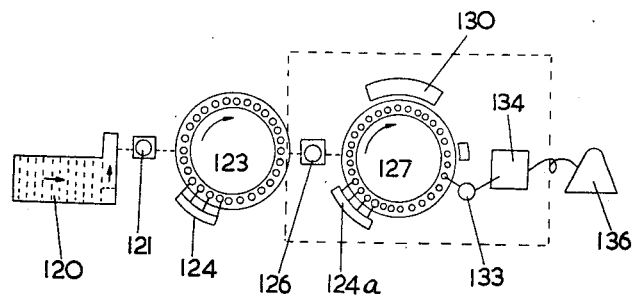
Figure 27:
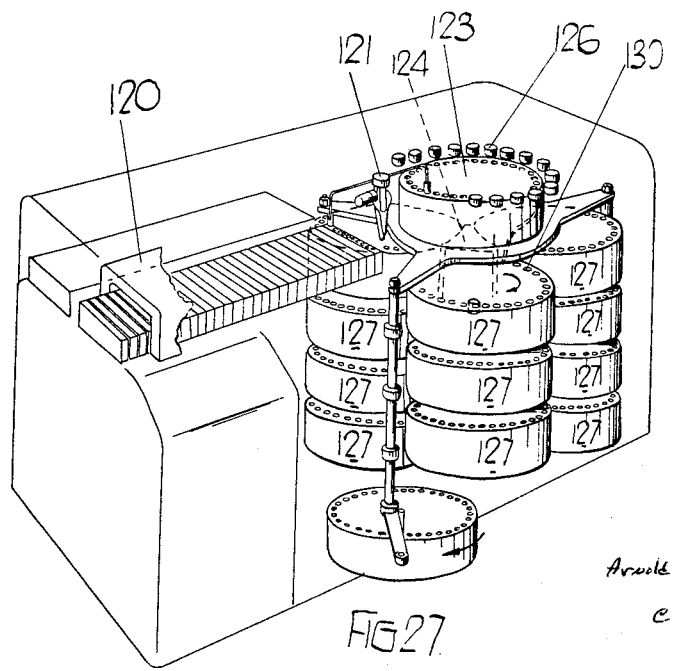
Figure 28:
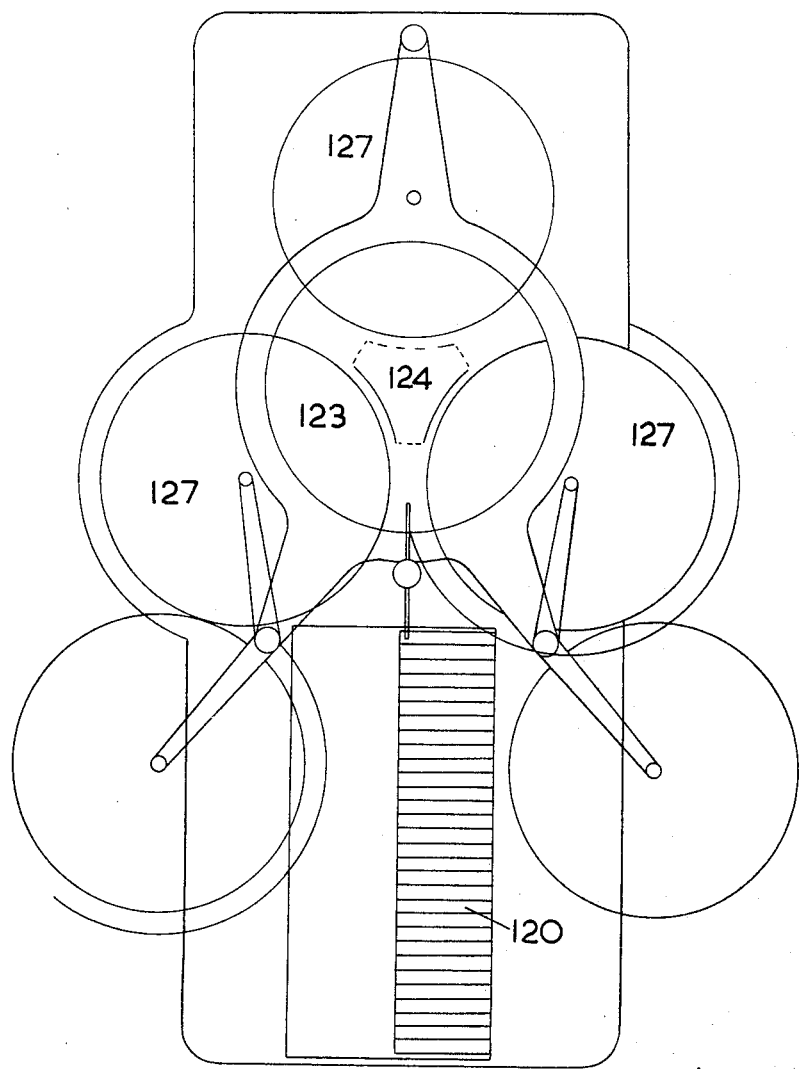
Figure 29:
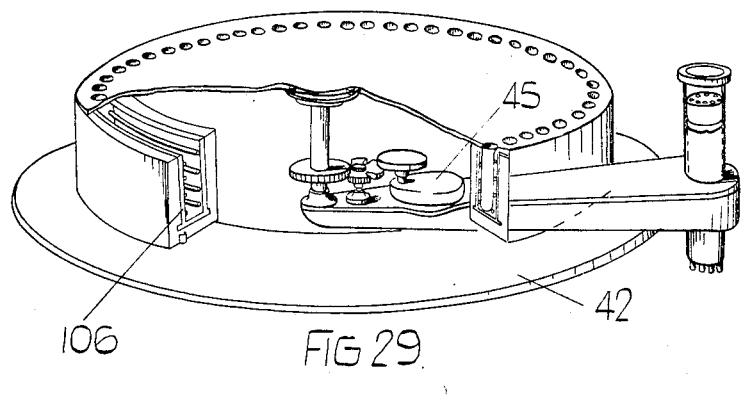
Figure 31:
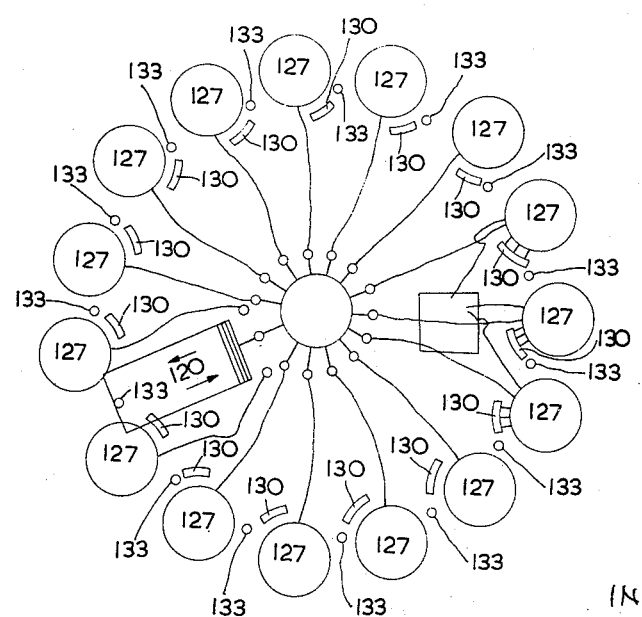

FIGURE 26 is a schematic lay-out for a laboratory incorporating the components illustrated in the preceding figures, only one analytical channel being shown in the dash-lined enclosure for simplicity of illustration;

FIGURE 27 is a perspective lay-out for a laboratory as shown in FIGURE 26;

FIGURE 28 is a diagrammatic plan view of a laboratory;

FIGURE 29 is a perspective view of a reaction rotor in the laboratory of FIGURES 27 and 28 with portions broken away to expose underlying structure;

FIGURE 30 is an alternative lay-out to FIGURE 27;

FIGURE 31 is a plan corresponding to FIGURE 30; and FIGURE 32 is a schematic view of the operation of the laboratory.

The tube bank illustrated in FIGURES 1 to 9 comprises two conveyor belts 1, 2 driveable through slip clutches between guides and having ridges 3 (FIGURE 3) for advancing sample blocks B, containing sample tubes T, towards a withdrawal station and taking them away again. The tube bank has a refrigerator operating through its base. The blocks B have grooved bottoms as shown in FIGURE 3 through which they are advanced at the ends of the tube bank by toothed rollers. The blocks B have a groove at one end as shown in FIGURES 7 and 8 and a trunnion pin at the other so as to ensure that they can only be placed one way in the centrifuge head shown in FIGURE 9. The blocks B furthermore have a row of holes in the bottom through which a pin may be passed to raise each tube T, and are painted on one side only to assist in their arrangement and individually numbered and marked by distinctive holes for photometric detection.

A sample of blood S from a patient is placed in a disposable polystyrene tube T having a flexible polyethylene cap. Ten such tubes T are placed in a block B and centrifuged (FIGURE 5) so that the blood separates into plasma P and packed red cells C. The centrifuged blocks are then placed in a tube bank (FIGURE 6) and advanced towards the withdrawal station as illustrated in FIGURES 1 to 3.

The withdrawal means shown in FIGURES 10 and 11 comprise a rotatable head 10 secured to a drive shaft 11 and having capillary tubes 13 and 14 projecting at opposite sides. The drive shaft 11 is journalled in a base 16 and loaded by a spring 17 to force the head 10 against the base 16. A gap is shown in FIGURE 10 for the purpose of illustration only. In the base 16 there are bores 19 for waste and 20 for diluent and cylinders 22 and 23 for drawing up predetermined quantities of liquid through the capillary tubes 13, 14. In the position shown in FIGURE 10, the cylinder 22 is expanded by the withdrawal of the plunger to draw up a predetermined quantity of plasma into the capillary tube 13 and the cylinder 23 is contracted to expel liquid which, once the cycle is established, will be plasma and diluent previously drawn up. The base 16 is rotated through 90° to the position shown in FIGURE 11. The cylinder 23 is expanded by the withdrawal of the plunger to draw up a predetermined quantity of diluent and the cylinder 22 is contracted to discharge excess plasma to waste through the bore 19. The base 16 is rotated through a further 90°, the cylinder 23 is contracted and the diluent and plasma discharged and the cylinder 22 is expanded as first described above to draw in a fresh sample of plasma. Thus the plunger below the cylinder 22 and 23 rise and fall alternately to draw in and expel liquid.

At the withdrawal station a pin operating through a hole in the bottom of the block B raises a tube T until the capillary tube 13 is immersed. Suction applied by a syringe pump (not shown) withdraws a predetermined amount of plasma P into the capillary tube 13. The tube T is lowered. The head 11 is turned through 180°. A predetermined quantity of diluent is forced through the bore 20 by a syringe pump (not shown) and washes the plasma P out of the capillary tube 13 into another tube. Meanwhile plasma is being withdrawn from the next tube in the block B into the capillary tube 14 for similar treatment.

In the alternative withdrawal means shown in FIGURES 12 and 13, a cylindrical piston 30 having a longitudinal groove 31 is slidable and rotatable in a cylindrical barrel 32. Plasma is drawn in and solution discharged through an opening 35 and diluent is drawn in through an opening 36. With the longitudinal groove aligned with the opening 35 (FIGURES 12a, b and 13a) the piston 30 is retracted a predetermined amount and plasma is drawn into the barrel 32. The piston 30 and the barrel 32 are mutually rotated through 180° (FIGURES 12c) and the piston 30 is further retracted (FIGURE 12d) a predetermined amount so that diluent is drawn into the barrel 32. The piston and barrel are again mutually rotated through 180° (FIGURE 12e). Finally the solution is discharged through the opening 35 by driving home the piston 30. In the FIGURE 12 embodiment the opening 35 is moved from the tube T to a tube $T_1$ between filling and discharge. The FIGURE 13 embodiment can also be used for reagent addition.

The multiport tap shown in FIGURES 14 and 15 is constructed of glass with a glass loaded polytetrafluoroethylene plug. It is in effect four four-way laboratory taps in one. The ports are interconnectable as shown in FIGURES 15 and 16. A is a U tube partially filled with mercury and arranged to be rocked by a cam driven by the actuating mechanism. B is a U tube with a blown bulb for metering reagent or diluent. C is a U tube for metering sample. Compressed air is supplied through the openings CA. The capillary tube 13 is a probe for picking up sample. Diluent is kept in a reservoir R.

With the tap in position shown, A is tilting so that sample is drawn in and completely fills C. Reagent flows into B and partly fills the overflow. The tap is rotated 90°. Compressed air (CA (1)) blows reagent from B, ejects sample from C and washes it through to discharge. The tap is rotated a further 180°. Compressed air (CA (2)) blows reagent from the overflow (D) back into the reservoir R. (CA (3)) blows surplus plasma in the tube 13 back into its original container.

The distributor shown in FIGURE 17 comprises a slotted base plate 40 for the adjustable mounting of reagent adders etc. On a shaft 41 upstanding from the base is rotatably mounted a wheel 42 having cavities 43 for tubes. The wheel 42 is adapted for step-wise rotation in phase with the remainder of the laboratory. The outside of the wheel 42 is equipped with removable pins for triggering off the appropriate addition of reagents etc. on arrival at the appropriate station.

The reagent adder shown in FIGURE 18 comprises two glass disc valves 50, 51 connected to a reagent reservoir R and to compressed air (C.A.) via an electromagnetic three-way valve adapted to operate all such adders simultaneously. In the normal position the lower part of the adder is full of reagent. On the application of compressed air the reagent feed valve 50 is closed and the discharge valve 51 is opened and a predetermined quantity of reagent is discharged into a tube represented by T.

The stirrer shown in FIGURE 19 comprises a plastic coated reed 60 adapted to dip into a tube T in the distributor wheel. The reed 60 carries a magnetic part 61 adapted to be moved to and fro by a solenoid 62 on the passage of alternating current.

The flow through cell shown in FIGURE 20 comprises a cell 70 fed through a probe 71 adapted to enter a tube of sample solution. The cell 70 is connected to a source of vacuum 73 through a magnetically operated valve 74 at the top and directly at the bottom. A colourimeter is represented by a bulb 76 and a screen 77. With the valve 74 open, the probe 71 is placed in the solution. The cell 70 fills. The probe 71 is withdrawn. The valve 74 is closed and the cell 70 empties. The geometry of the cell 70 is such that the solution which enters first misses the walls and drains below the light path.

The pressure transfer device of FIGURE 21 comprises a cell 80 adapted to be filled with solution through a probe 81. A motor driven syringe 83 draws solution through a magnetically operated valve 84 into the cell 80. The valve 84 is closed and the solution is driven on to a flame photometer at a constant rate through a similar valve 85. The alternative device shown in FIGURE 22 comprises a cell 90 and a probe 91 controlled by a motor driven double two-way tap 93 having a connection 95 to compressed air. With the tap 93 at 90° to the position shown vacuum is applied to the cell 90 and solution is drawn up through the probe 91. The tap is then turned to the position shown and the compressed air forces the solution out of the cell 90 towards a flame photometer.

The heating means for the reaction rotor shown in FIGURE 23 comprises a stationary trough 101 through which heating liquid is passed, in at 102 and out at 103. The tubes T are mounted in a rotatable rack which in effect forms the reaction rotor. The alternative heating means shown in FIGURE 24 comprises the whole reaction rotor 105 having heater elements 106 surrounding it.

The wash head shown in FIGURE 25 is for lowering onto tubes T to be washed. A spring-loaded suction tube 111 of plastics material contacts the bottom of the tube T to be washed and by so doing releases wash liquid 112 from a number of jets 113 higher up in the tube T to be washed. A complete tube laudry comprises three or four wash heads operating on each tube in sequence, the wash liquids being detergent or acid, detergent, water, and extra water (if necessary).

In the schematic layout of FIGURE 28, there is a tube bank 120 as illustrated in FIGURES 1 to 9 on the left. Operating at the withdrawal station at the end of this tube bank is withdrawal and dilution means 121 as illustrated in FIGURES 10 and 11, 12, 13, or 14, 15 and 16. The withdrawal and dilution means discharges diluted solution into a number of tubes in a distributor 123 as illustrated in FIGURE 17 equipped with a tube laundry 124 comprising four wash heads as shown in FIGURE 25. Each analytical channel comprises withdrawal and dilution means 126 as described above which discharge diluted solution into a reaction rotor 127 which is similar to but has larger cavities than the distributor described above but is surrounded by means for heating the tubes as illustrated in FIGURE 23 or 24. Into selected tubes in the reaction rotor are injected reagents from adders 130 as illustrated in FIGURE 18. The resultant mixtures are stirred by means 132 as illustrated in FIGURE 19. Then samples are withdrawn for analysis by devices 133 as illustrated in FIGURES 20, 21 or 22 as appropriate. An actual detector is schematically represented by 134 and the register for results by 136.

In the perspective views of FIGURES 27, 28, and 29 certain parts such as the stirrers and part of the tube bank 120 are omitted for the sake of clarity. The general arrangement is however illustrated and FIGURE 29 shows how the reaction rotors can be swung out of position for maintenance. FIGURE 29 shows how a heater unit comprising heater elements 106 as in FIGURE 24 is spigot mounted on a base 42 as in FIGURE 17. Space is left for the mounting of ancillary equipment. A synchronous motor 45 indexes the rotor via gearing.

In the arrangement of FIGURES 30 and 31 there is space between the distributor 123 and the reaction rotors 127 for withdrawal means 126 and room around the rotors 127 for other ancillary equipment which has been symbolized by the reagent adders 130 and transfer samples 133.

What we claim is:

1. An automatic laboratory including a withdrawal station, means for conveying receptacles containing liquid samples to be treated sequentially to and from said withdrawal station, means arranged at said withdrawal station to withdraw a predetermined quantity of sample liquid from a receptacle, to mix a predetermined quantity of diluent liquid therewith and to discharge the mixture into one of a plurality of further receptacles, a treatment channel, means for conveying each said further receptacle to said treatment channel, and means arranged at said treatment channel to withdraw liquid from each further receptacle sequentially conveyed thereto and to add to said liquid withdrawn from each further receptacle a quantity selected from the group consisting of diluent, reagent and mixtures thereof.

2. An automatic laboratory as claimed in claim 1, wherein receptacle washing means are associated with the means for conveying said further receptacles to the treatment channel.

3. An automatic laboratory as claimed in claim 1, wherein the withdrawal and diluting means includes a first piston and cylinder assembly operable to draw a predetermined quantity of liquid sample to be treated from a receptacle at said withdrawal station into a conduit, and a second piston and cylinder assembly operable to draw a predetermined quantity of diluent liquid from a supply thereof and to expel the mixture of sample and diluent liquid to a further receptacle after the conduit containing the sample liquid has been orientated to a position in the discharge path of said second piston and cylinder assembly.

4. An automatic laboratory as claimed in claim 1, wherein the means for conveying the receptacles to and from said withdrawal station includes a plurality of containers each adapted to accommodate a plurality of tubes or like receptacles and means for advancing said containers to said station and subsequently withdrawing said containers from said station.

5. An automatic laboratory as claimed in claim 4, wherein the containers are adapted for mounting in a centrifuge.

6. An automatic laboratory as claimed in claim 1, wherein the treatment channel includes a heatable reaction conveyor arranged to convey liquid samples in receptacles around a circuit, and wherein reagent adding means, analyzing means and receptacle washing means are arranged sequentially around said circuit.

7. An automatic laboratory as claimed in claim 6, wherein the heatable reaction conveyor is in the form of a circular rotor.

8. An automatic laboratory as claimed in claim 6, wherein stirring means are incorporated in the treatment channel and are arranged downstream of the reagent adding means in the path of the conveyor to stir the liquid sample and reagent conveyed in each receptacle.

9. An automatic laboratory as claimed in claim 6, wherein the washing means includes at least one wash head arranged for movement into a receptacle to be washed, a springloaded suction tube associated with the wash head and operable on contacting the receptacle bottom to trigger jets for supplying washing liquid into said receptacle and to withdraw said washing liquid from said receptacle by suction.

10. An automatic laboratory as claimed in claim 6, wherein the analyzing means includes a colorimeter.

11. An automatic laboratory as claimed in claim 6, wherein the analyzing means includes a flame photometer.

12. An automatic laboratory including a withdrawal station, means for conveying receptacles containing liquid samples to be treated sequentially to and from said withdrawal station, means arranged at said withdrawal station to withdraw a predetermined quantity of sample liquid from a receptacle, to mix a predetermined quantity of diluent liquid therewith and to discharge the mixture into one of a plurality of further receptacles, a plurality of treatment channels, means for conveying each said further receptacle sequentially to each of the treatment channels, and means arranged at each treatment channel to withdraw liquid from each further receptacle sequentially conveyed thereto and to add to said liquid withdrawn from each further receptacle a quantity selected from the group consisting of diluent, reagent and mixtures thereof.

References Cited

UNITED STATES PATENTS

| | | | |
|---|---|---|---|
| 3,178,266 | 4/1965 | Anthon | 23—253 |
| 3,188,181 | 6/1965 | Peterson et al. | 23—253 X |
| 3,193,358 | 7/1965 | Baruch | 23—253 |
| 3,193,359 | 7/1965 | Baruch et al. | 23—253 X |
| 3,219,416 | 11/1965 | Natelson | 23—230 X |

MORRIS O. WOLK, Primary Examiner

E. A. KATZ, Assistant Examiner

U.S. Cl. X.R.

23—259